US007056489B2

(12) United States Patent
Corma Canós et al.

(10) Patent No.: US 7,056,489 B2
(45) Date of Patent: Jun. 6, 2006

(54) SYNTHESIS OF ZEOLITE ITQ-16 IN AN ALKALINE MEDIUM

(75) Inventors: Avelino Corma Canós, Valencia (ES); Teresa Navarro Villalba, Valencia (ES); Susana Valencia Valencia, Valencia (ES); Fernando Rey García, Valencia (ES)

(73) Assignees: Consejo Superior de Investigaciones Cientificas, Madrid (ES); Universidad Politenica de Valencia, Valencia (ES)

( * ) Notice: Subject to any disclaimer, the term of this patent is extended or adjusted under 35 U.S.C. 154(b) by 212 days.

(21) Appl. No.: 10/632,535

(22) Filed: Aug. 1, 2003

(65) Prior Publication Data

US 2004/0089587 A1 May 13, 2004

Related U.S. Application Data

(63) Continuation of application No. PCT/ES02/00057, filed on Feb. 8, 2002.

(30) Foreign Application Priority Data

Feb. 9, 2001 (ES) ................................ 200100385

(51) Int. Cl.
*C01B 39/48* (2006.01)
(52) U.S. Cl. ...................... 423/705; 423/706; 423/708; 423/718; 423/DIG. 27
(58) Field of Classification Search ................. 423/706, 423/705, 708, 718, DIG. 27
See application file for complete search history.

(56) References Cited

U.S. PATENT DOCUMENTS

RE28,341 E    2/1975  Wadlinger et al.
6,733,742 B1 * 5/2004  Elomari ....................... 423/706

6,787,124 B1 * 9/2004  Chester et al. .............. 423/718

FOREIGN PATENT DOCUMENTS

| ES | 2128961 | 5/1999 |
|----|---------|--------|
| ES | 2152143 | 1/2001 |
| WO | WO9522507 | 8/1995 |
| WO | WO9829338 | 7/1998 |

OTHER PUBLICATIONS

J.M. Newsam et al, Structural Characterization of Zeolite Beta, 1988, pp. 375-405.
Beta family, polymorph A (*BEA)—polymorph B, Zeolites 16:323-802, 1996, p. 641.
Joaquin Perez-Pariente et al, Crystallization Mechanism of Zeolite Beta From (TEA)$_2$O, Na$_2$O and K$_2$O Containing Aluminosilicate Gels, Applied Catalysis, 31 (1987) 35-64.
Corma, A. et al.; ITQ-16; a new zeolite family of the beta group with different proportions of polymorphs A,B and C; Chem. Commun., 2001, vol. 18, pp. 1720-1721; ISSN 1359-7345; Sep. 14, 2001.

* cited by examiner

*Primary Examiner*—David Sample

(57) ABSTRACT

The invention relates to a method for synthesizing a family of zeolite materials, grouped together under the name ITQ-16, in an OH$^-$ medium and in the absence of fluorides and to the catalytic applications thereof. The zeolite ITQ-16 family of materials is characterized by having different proportions of distinct polymorphs A, B and C described as possible intergrowths in the Beta zeolite and, therefore, the X-ray diffraction patterns of said family are different from that described for the Beta zeolite. In its calcinated form, zeolite ITQ-16 has the following empirical formula: $x(MXO_2):tTO_2:gGeO_2:(1-g)SiO_2$, wherein T is one or more elements having +4 oxidation status and different from Ge and Si; X is one or more elements having +3 oxidation status; and M can be H$^+$ or one or more inorganic cations with a +n charge.

28 Claims, 9 Drawing Sheets

Zeolite Beta

Polymorph C

SYNTHESIS OF ZEOLITE ITQ-16 IN AN ALKALINE MEDIUM

RELATED APPLICATIONS

The present application is a Continuation of co-pending PCT Application No. PCT/ES02/00057, filed Feb. 8, 2002 which in turn, claims priority from Spanish Application Serial No. 200100385, filed on Feb. 9, 2001. Applicants claim the benefits of 35 U.S.C. §120 as to the PCT application and priority under 35 U.S.C. §119 as to said Spanish application, and the entire disclosures of both applications are incorporated herein by reference in their entireties.

TECHNICAL FIELD

Microporous crystalline materials

BACKGROUND

Zeolite Beta is a microporous material with channels formed by 12 member rings, that has a characteristic diffraction pattern (Pérez-Pariente, J., Martens, J. A., Jacobs, P. A., Applied Catalysis, 31, (1987) 35).

This zeolite is formed by intergrowth of different polymorphs related to each other, just as it has been described in literature (J. M. Newsam, M. M. J. Treacy, W. T. Koetsier, C. B. de Gruyter, Proc. R. Soc. London A. 420 (1988)375). Of all the polymorphs described, it seems that polymorphs A and B are the ones that basically form intergrowth called zeolite Beta (Zeolites, 5/6, (1996), 641) while the polymorph C is found in a smaller proportion in said intergrowth.

Hence, it should be possible to synthesize new materials with proportions different from those of the different polymorphs A, B and C that would lead to structures with an X-ray diffractogram different from that of zeolite Beta just as it is defined in accordance with its X-ray diffractogram, and different from that of the pure polymorph C.

DESCRIPTION OF THE INVENTION

The present invention refers to a process for synthesis in an OH⁻ medium and in the absence of fluorides, of a new family of zeolitic materials that fit in the name ITQ-16, and to its catalytic uses.

Zeolite ITQ-16 is related to zeolite Beta, but has a different X-ray diffractogram which is attributed to the presence of a proportion of the different polymorphs different from the one that has been found in zeolite Beta. Hence, zeolite ITQ-16 could be comprised, aside from polymorphs A and B characteristic of zeolite Beta, of another polymorph that could correspond to polymorph C proposed by Newsam et al. (J. M. Newsam, M. M. J. Treacy, W. T. Koetsier, C. B. de Gruyter. Proc. R. Soc. London A, 420 (1988) 375.) Therefore, the presence of this other polymorph gives the material ITQ-16 a characteristic X-ray diffraction pattern different from the one of zeolite Beta.

The X-ray diffraction pattern of the material ITQ-16, just as it is synthesized, has been obtained in a Philips PW 1830 diffractometer with a PW 1710 controller and using Cu Kα radiation. The diffractogram obtained by means of the powder method and using a variable divergence crack is shown in Table I and is characterized by the following 2θ angle (degrees) and relative intensities $(I/I_0)$ $I_0$ being the intensity of the most intense peak to which a value of 100 is given. Relative intensities have been expressed in the following terms w=weak intensity (between 0 and 20%); a=average intensity (between 20 and 40%); s=strong intensity (between 40 and 60%) and vs=very strong intensity (between 60 and 100%).

TABLE I

| 2θ (degrees) | Intensity |
| --- | --- |
| 6.91 | w |
| 7.68 | w |
| 9.60 | a |
| 15.16 | w |
| 19.35 | w |
| 21.03 | w |
| 21.39 | w |
| 22.00 | vs |
| 23.19 | w |
| 25.03 | w |
| 26.04 | w |
| 27.08 | a |
| 27.89 | w |
| 29.32 | w |
| 30.51 | w |
| 32.83 | w |
| 34.46 | w |
| 35.27 | w |
| 35.93 | w |
| 39.22 | w |

The variation in the measurements of the 2θ angle due to the instrumental error is estimated at ±0.05 degrees.

The positions, widths and relative intensities of the diffraction peaks can be modified according to the chemical composition of the material (type of structure directing agent, Si/Ge ratio, presence of other trivalent and/or tetravalent heteroatoms (one or several) in the lattice, aside from silicon and/or germanium, such as for example: aluminum, boron, titanium, vanadium, etc.), as well as the degree of hydration and crystal size. In particular, the pattern represented in table I refers to materials whose lattice is comprised exclusively of silicon and germanium oxide, with a Si/Ge ratio=5 and synthesized using the benzyl-DABCO (BD⁺) cation, as structure directing agent.

Table 2 shows the values of the 2θ angle and relative intensities $(I/I_0)$ of the X-ray diffractogram reflections of powder of the prior sample of ITQ-16 after being roasted at 580° C. in order to eliminate the organic compounds occluded inside the zeolite, wherein w, a, s and vs have the same meanings as in table I.

TABLE II

| | |
| --- | --- |
| 6.87 | s |
| 7.64 | a |
| 9.60 | s |
| 13.32 | w |
| 13.88 | w |
| 15.39 | w |
| 19.25 | w |
| 19.97 | w |
| 21.15 | a |
| 22.10 | vs |
| 23.24 | w |
| 25.01 | w |
| 26.81 | a |
| 27.98 | w |
| 29.25 | w |
| 30.28 | w |
| 31.79 | w |
| 32.88 | w |
| 34.36 | w |
| 35.16 | w |
| 35.97 | w |
| 39.25 | w |

The X-ray diffraction pattern of zeolite ITQ-16 mainly differs, with respect to zeolite Beta, in that at low angles it has, aside from a wide peak with a value of 2θ around 7.6°, two peaks at 2θ angles of 6.9° and 9.6°, that in general show a smaller width at an average height than the peak at 7.6°.

The relative intensity of these peaks varies since the proportion of the polymorphs A, B and C in the ITQ-16 zeolite structure, varies, the limits being the pure polymorph C, proposed by Newsan, and zeolite Beta (Pérez-Pariente, J., Martens, J. A., Jacobs, P. A., Applied Catalysis, 31 (1987) 35) U.S. Pat. No. Re28341).

Therefore, this specification describes the process of synthesis of a family of materials that has zeolite Beta and another polymorph that could be polymorph C as the extreme and outside limits. Contrary to what happens in zeolite ITQ-16, the peaks at angles 6.9° 7.6° and 9.6° are not found simultaneously in zeolite Beta and in the possible polymorph C.

The present invention refers to a new process of synthesis of a material named ITQ-16, characterized by means of synthesis with an initial pH between 14 and 9 and preferably between 13 and 10 and the use of hydroxide anions as a mineralizing agent, and without introducing fluoride anions as mineralizing agents, and the presence of organic compounds as structure directing agents.

Said organic compounds can be cations of the tetraalkylammonium type with a general formula (R1R2R3R4N)$^+$ wherein R1, R2, R3 and R4 can be alkyl or aromatic chains with 1 to 16 carbon atoms, that may or may not form cycles on the nitrogen atom. Besides, the use of organic polycations with a general formula of $R_mN_x((CH_2)_n)_p$ wherein x may have values between 2 and 12, is also described. n refers to the number of carbon atoms that form some of the alkyl chains bridge between two contiguous nitrogen atoms and may vary between 1 and 6; p refers to the number of alkyl chains a bridge existing between nitrogen atoms and it can vary between 2 and 24, and R R refers to alkyl or aryl groups bonded to a single nitrogen (N) atom containing between 1 and 12 carbon atoms and m has a value that can vary between 0 and 36.

The preparation process of the present invention is based on heating at temperatures between 80° C. and 250° C. and preferably between 130° C. and 175° C. a reaction mixture that contains a Si source, among which amorphous silica, colloidal silica, silica gel, tetraalkylorthosilicate, sodium silicate and a germanium source such as for example germanium oxides, halides or alkoxides are preferred. The synthesis mixture contains one or more of the following organic cations in their hydroxide form as a structure directing agent, without this being restrictive: TEA$^+$, BD$^+$, BQ$^+$, m-XydQ$^{2+}$, M$_4$BD$^{2+}$, C$_y$HMP$^+$ MCyHMP$^+$. Alternatively, it is possible to use the organic cation in the form of a salt (for example, a halide, preferably chloride or bromide) and adding a source of alkaline or alkaline earth ions, preferably in the form of a hydroxide.

Optionally, trivalent cations such as for example Al, B, Ga, Fe or Cr, and/or tetravalent cations such as Ti, V or Sn can be introduced in the synthesis gel.

On occasions it may also be convenient to add at some point of the preparation process a crystalline material, preferably a zeolitic material and more preferably ITQ-16 crystals (between 0.01 and 25% by weight with respect to all the inorganic oxides together, preferably between 0.05% and 10% by weight) as crystallization (seeding) promoters.

In the particular case of using the BD cation as a structure directing agent, the composition of the synthesis mixture is characterized by the following ranges of molar ratios:

BD/(SiO$_2$+GeO$_2$)=between 3 and 0.01 and preferably between 1 and 0.03.

H$_2$O/(SiO$_2$+GeO$_2$)=between 1000 and 0.5, and preferably between 100 and 2.

GeO$_2$/(SiO$_2$+GeO$_2$), defined as g; =between 0.8 and 0.005, and preferably between 0.5 and 0.032, and more preferably between 0.333 and 0.0625.

(Si+Ge)/X=between 5 and ∞ and preferably higher than 15, and more preferably higher than 20.

SiO$_2$+GeO$_2$/TO$_2$=between 10 and ∞, and preferably between 1 and 0, and more preferably between 0.5 and 0.

M$^{n+}$/SiO$_2$+GeO$_2$=between 2 and 0, preferably between 1 and 0, and more preferably between 0.5 and 0.

wherein X represents an element in its trivalent oxidation state such as Al, B, Fe, Ga or Cr; T is an element in its tetravalent oxidation state such as Ti, Sn or V and M is an alkaline or alkaline earth cation such as Na$^+$, Ba$^{2+}$, K$^+$, Ca$^{2+}$, etc.

Once crystallization is complete, the solids are separated from the mother liquors by filtration or centrifugation. A highly crystalline solid that contains occluded organic material is obtained as a result.

The solid product obtained has a characteristic diffraction pattern (CuKα radiation) just as it is presented in table I, and that has a certain similarity with the one of zeolite Beta (U.S. Pat. No. Re28341) at a high angle 2θ>20°, wherein θ is the Bragg angle and has little similarity at low angles.

The occluded organic material is eliminated by vacuum roasting, air, N$_2$ or another inert gas, at a temperature higher than 450° C., and preferably at a temperature higher than 500° C. and lower than 900° C. The X-ray diffraction pattern of the roasted material is shown in table II.

Hence, roasted zeolite ITQ-16 has a diffraction peak around 7.6°, characterized by a width at medium height of around 1° and characteristic of zeolite Beta (Newsam et al., Proc. R. Soc. London A, 1988, 420, 375) with a certain intergrowth of polymorphs A and B, but it also has two peaks at 6.9° and 9.6° corresponding to the presence of another polymorph that could be the polymorph C. Hence, zeolite ITQ-16 has a degree of intergrowth different from that of zeolite Beta.

The material in its roasted form has the following empirical formula:

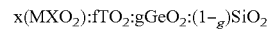

$$x(MXO_2):fTO_2:gGeO_2:(1-_g)SiO_2$$

wherein T may be one or several elements with a +4 oxidation state different from Ge and Si such as for example Ti, V, Sn; X may be one or several elements with a +3 oxidation state such as for example Al, Ga, B, Cr, Fe and M may be H$^+$ or one or several +n charge compensation inorganic cations such as for example Li$^+$, Na$^+$, K$^+$, Ca$^{2+}$, Mg$^{2+}$, etc.

The value of g should be between 0.8 and 0.005, and preferably between 0.5 and 0.032, and more preferably between 0.333 and 0.0625. The SiO$_2$+GeO$_2$/TO$_2$ is between 10 and ∞, preferably higher than 20. In the event that zeolite ITQ-16 is to be synthesized with trivalent cations, X, such as for example Al, the Si+Ge/Al ratio is comprised between 5 and ∞, and preferably higher than 15, and more preferably higher than 20.

The following uses for the zeolite ITQ-16 synthesized in the present specification are described in the present specification:

as components of catalysts in a cracking process, of catalytic cracking of hydrocarbons, and in general of organic compounds in a hydrocracking process, an olefin hydroisomerization process, a light paraffin isomerization process, a dewaxing or isodewaxing of paraffin process, as a component or additive of light paraffin isomerization catalysts, as components of catalysts in a hydrocracking process selected among gentle hydrocracking of hydrocarbides and gentle hydrocracking of functionalized hydrocarbides, as catalysts in an alkylation process selected from among alkylation of olefins with isoparaffins, alkylation of isoparaffins with olefins and alkylation of aromatics or aromatic substituted with olefins or alcohols, in particular in a process of alkylation of benzene with propylene, as catalysts in an Oppenauer oxidation process, or a Meerwein-Pondorf-Verley type reduction process or as catalysts in acylation reactions of aromatic compounds substituted by using acids, acid or anhydride chlorides of organic acids as acylating agents.

The materials prepared according to the process of the invention that contain Ti, V or Sn can be used in selective oxidation processes of organic compounds using $H_2O_2$ or organic peroxides or hydroperoxides as oxidizing agents.

The materials prepared according to the process of the invention that contain Sn, may be used in Bayer-Villiger type oxidation processes.

The materials prepared according to the process of the invention may also be used as components of catalysts in order to eliminate organic vapors (OVC).

In the case of ITQ-16 containing Ti, use thereof as a catalyst of olefin epoxydation, alkane oxidation, alcohol oxidation and oxidation of thioethers to sulfoxides and sulfanes using organic or inorganic hydroperoxide, such as for example $H_2O_2$, tetrabutylhydroperoxide, cumene hydroperoxide, as oxidating agents, is claimed.

In the event that Sn is contained, use thereof is claimed as oxidation catalysts in Bayer-Villiger reactions using $H_2O_2$ as the oxidizing agents. Finally, use thereof in amoxydation of cyclohexanone to cyclohexanone oxime with $NH_3$ and $H_2O_2$ is claimed.

EXAMPLES

Example 1

7.21 g of tetraehtylorthosilicate (TEOS) are hydrolyzed in 20.22 g of an aqueous solution of BD ($9.27.10^{-4}$ moles of BD(OH)/g). Then 0.653 g. of $GeO_2$ are added. The mixture is left stirring and evaporating the ethanol formed in hydrolysis of TEOS and 12.3 g. of water. The resulting mixture is heated in autoclaves coated inside with PFTE at 150° C. After heating the mixture for 4.5 days same is filtered and 22 g. of zeolite ITQ-16 per 100 g of synthesis gel are obtained.

Figure 1:
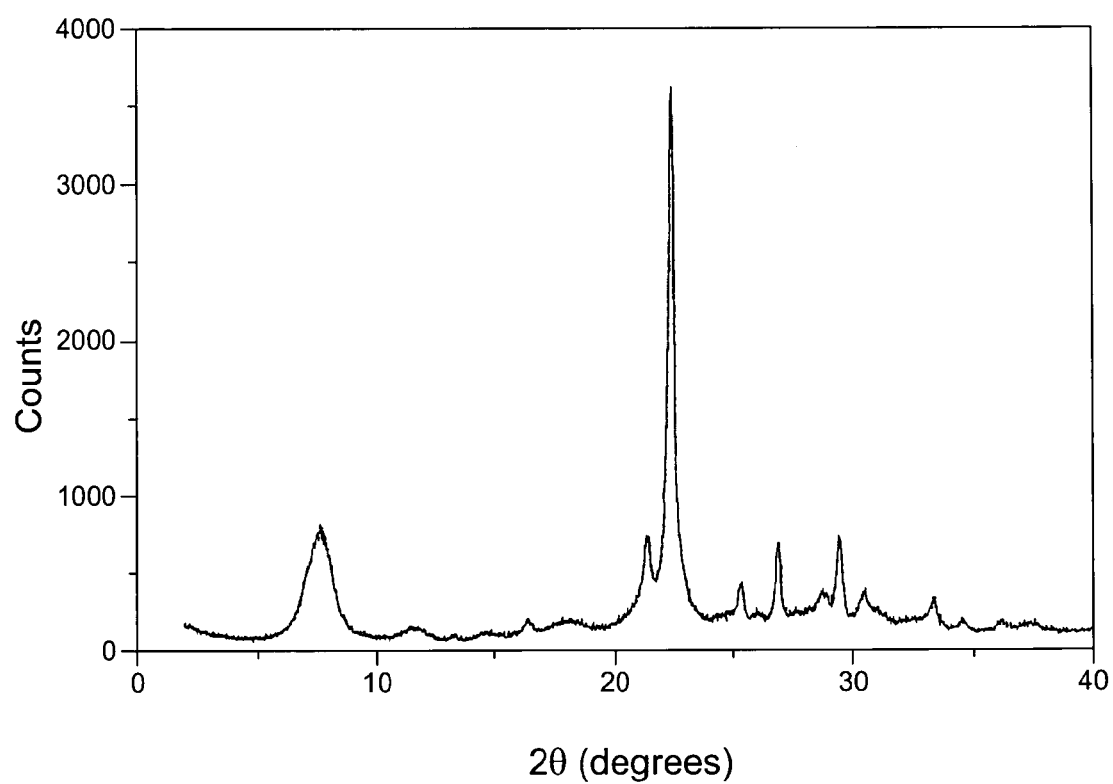
FIG. 1 shows a characteristic diffraction pattern of zeolite Beta.
Figure 2:
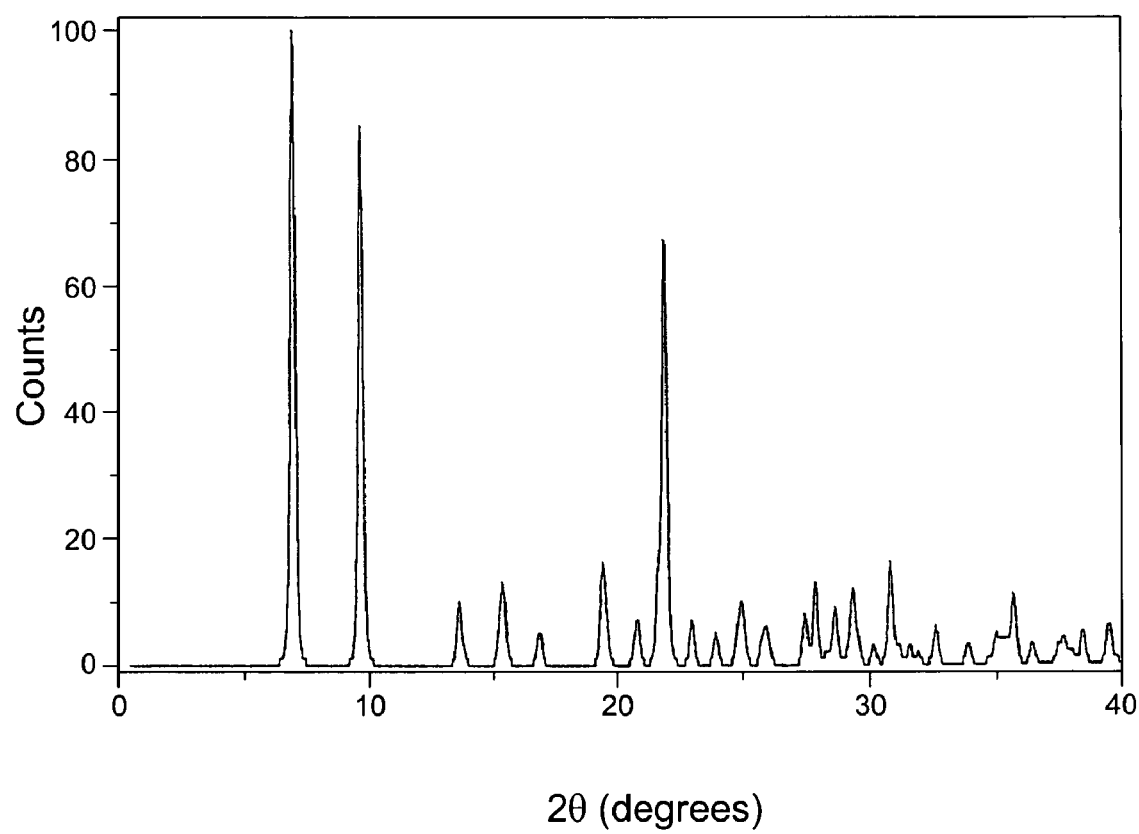
FIG. 2 shows a diffractogram of the polymorph C of zeolite Beta calculated from the structure proposed in *Proc. R. Soc. London A*, 420 (1988) 375.
Figure 3:
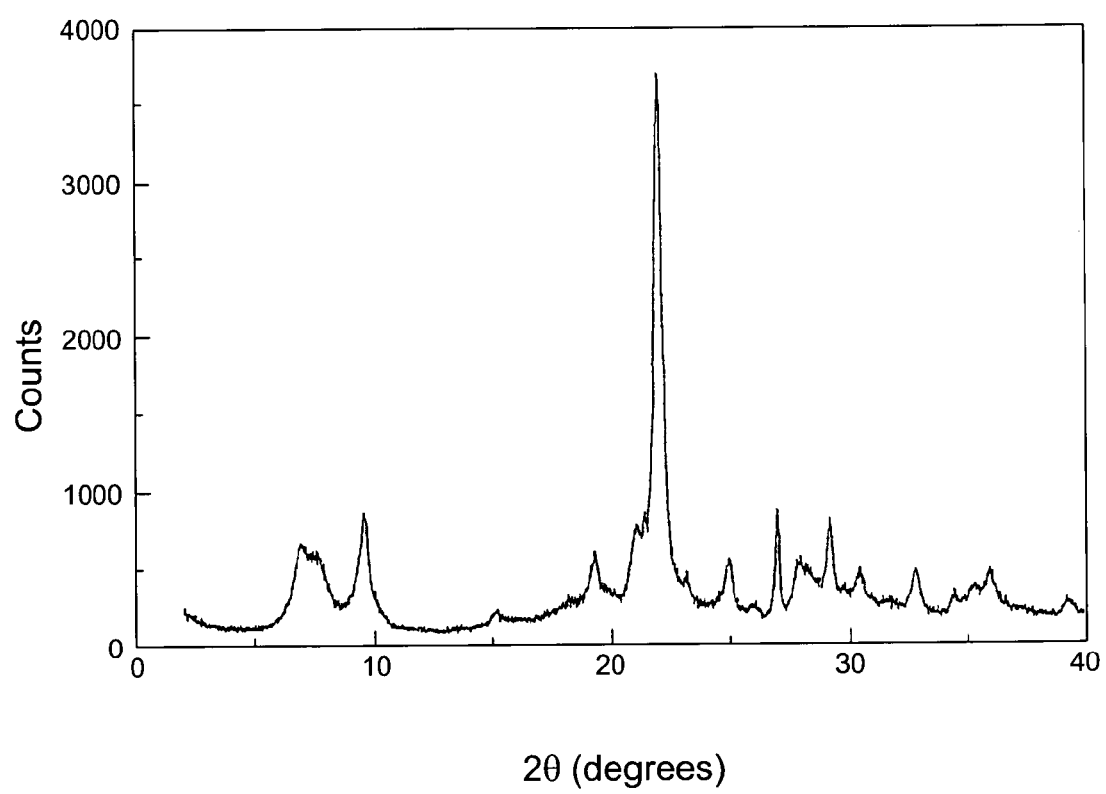
FIG. 3 shows an X-ray diffractogram of zeolite ITQ-16 without roasting, whose lattice is comprised of materials that only contain silicon and germanium oxide, that corresponds to the data contained in Table I.

The X-ray diffraction pattern is presented in FIG. 3.

Example 2

7.21 g of tetraethylorthosilicate (TEOS) are hydrolyzed in 20.22 g of an aqueous solution of BD ($9.27.10^{-4}$ moles of BD(OH)/g). Then 0.653 g. of $GeO_2$ and 0.077 g Se aluminum isoperoxide are added. The mixture is left stirring and evaporating the ethanol formed in hydrolysis of TEOS and 12.3 g. of water. The resulting mixture is heated in autoclaves coated inside with PFTE at 150°. After heating the mixture for 7 days same is filtered and 18 g. of zeolite ITQ-16 per 100 g of synthesis gel are obtained.

Figure 6:
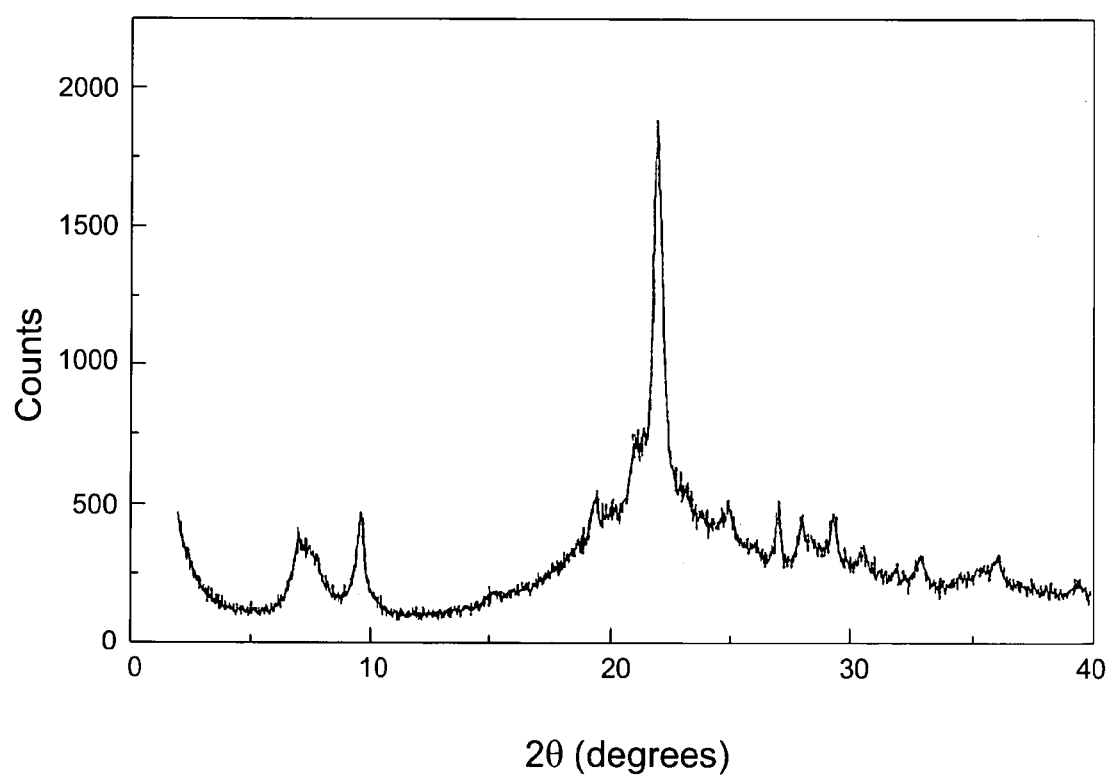
FIG. 6 shows the characteristic diffraction pattern of zeolite ITQ-16 prepared according to example 2.

The X-ray diffraction pattern is presented in FIG. 6.

Example 3

9.37 g of tetraethylorthosilicate (TEOS) are hydrolyzed in 20.71 g of an aqueous solution of BD ($2.0.10^{-3}$ moles of BD(OH)/g). Then 0.313 g. of $GeO_2$ are added. The mixture is left stirring and evaporating the ethanol formed in hydrolysis of TEOS and 10.34 g. of water. The resulting mixture is heated in autoclaves coated inside with PFTE at 135°. After heating the mixture for 6 days same is filtered and 24 g. of zeolite ITQ-16 per 100 g of synthesis gel are obtained.

Figure 7:
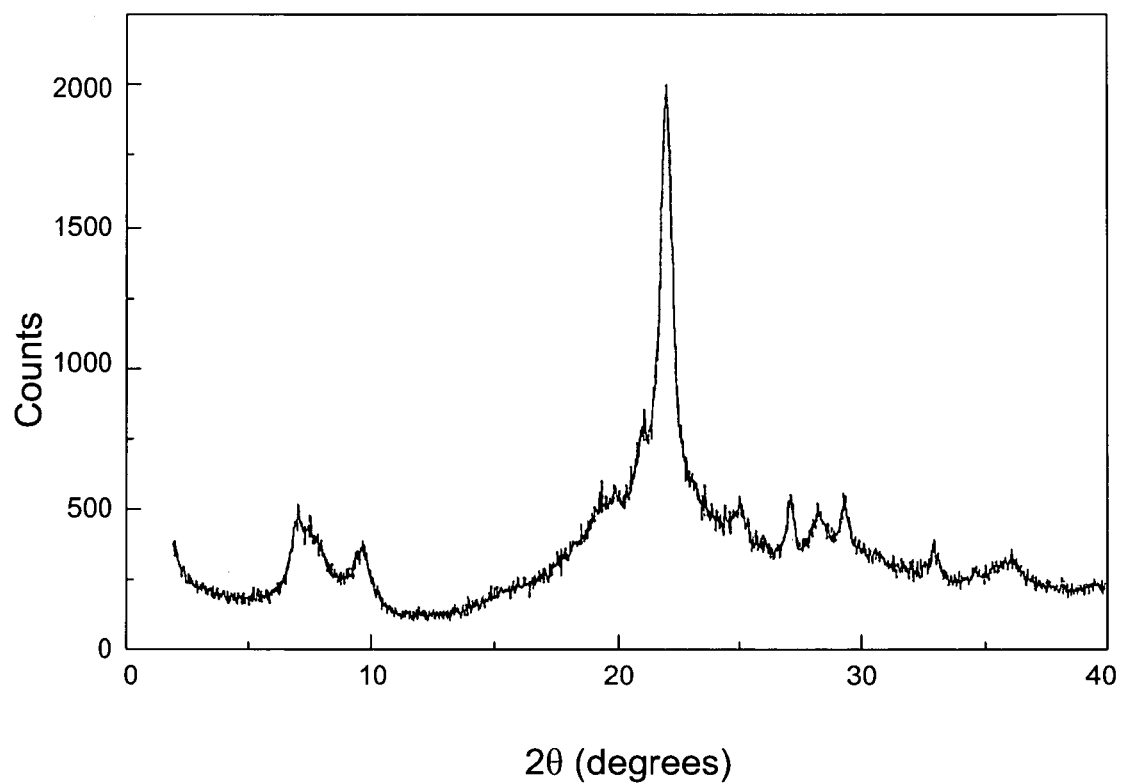
FIG. 7 shows the characteristic diffraction pattern of zeolite ITQ-16 prepared according to example 3.

The X-ray diffraction pattern is presented in FIG. 7.

Example 4

5.21 g of tetraehtylorthosilicate (TEOS) are hydrolyzed in 20.22 g of an aqueous dissolution of BD ($9.27.10^{-4}$ moles of BD(OH)/g). Then 1.307 g. of $GeO_2$ are added. The mixture is left stirring and evaporating the ethanol formed in hydrolysis of TEOS and 12.5 g. of water. The resulting mixture is heated in 5.21 of tetraethylorthosilicate (TEOS)$_4$ hydrolyzed in 20.2 g of an aqueous solution of BD ($9.27.10^{-4}$ moles of BD(OH)/g). Then 1.307 g of $GeO_2$ are added. The mixture is left stirring and evaporating the ethanol formed in hydrolysis of TEOS, in autoclaves coated inside with PFTE at 150° C. After heating the mixture for 1 day same is filtered and 13 g. of zeolite ITQ-16 per 100 g of synthesis gel are obtained.

Figure 8:
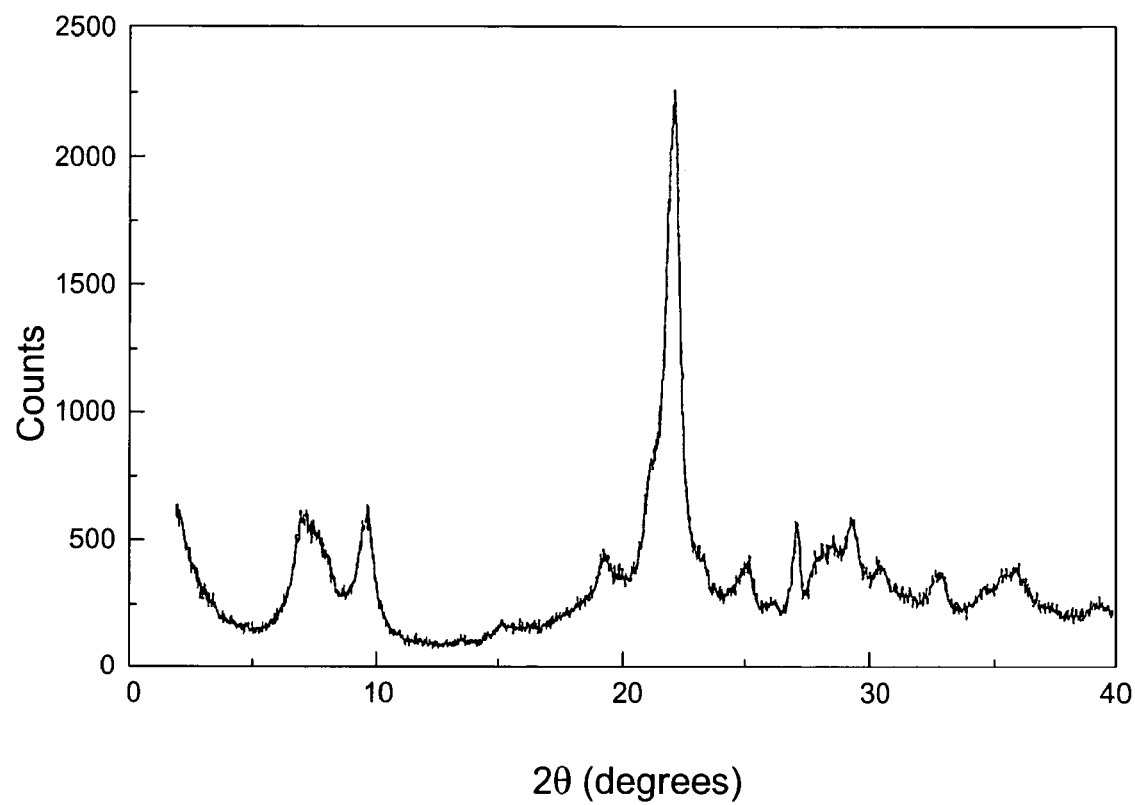
FIG. 8 shows the characteristic diffraction pattern of zeolite ITQ-16 prepared according to example 4.

The X-ray diffraction pattern is presented in FIG. 8.

Example 5

5.21 g of tetraehtylorthosilicate (TEOS) are hydrolyzed in 14.9 g of an aqueous solution of m-XydQ ($9.37.10^{-3}$ m m-XydQ(OH)$_2$/g). Then 1.307 g. of $GeO_2$ are added. The mixture is left stirring and evaporating the ethanol formed in hydrolysis of TEOS and 2.8 g. of water. The resulting mixture is heated in autoclaves coated inside with PFTE at 150°. After heating the mixture for 7 days same is filtered and 13 g. of zeolite ITQ-16 per 100 g of synthesis gel are obtained.

Figure 9:
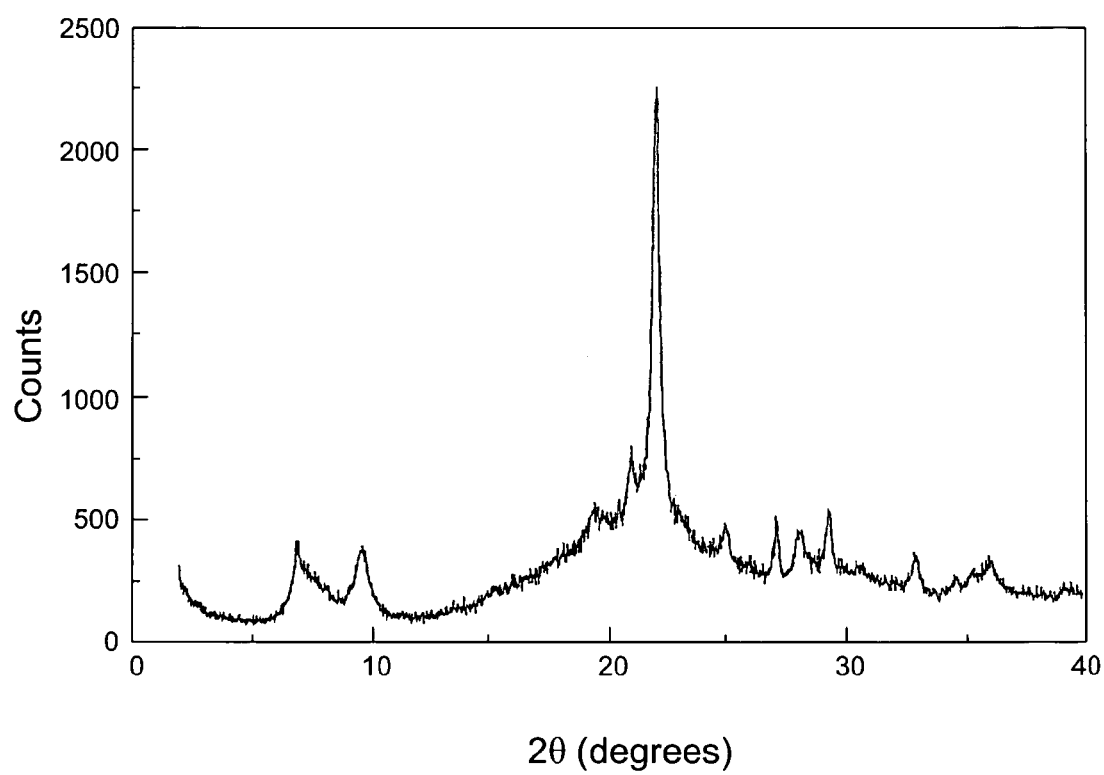
FIG. 9 shows the characteristic diffraction pattern of zeolite ITQ-16 prepared according to example 5.

The X-ray diffraction pattern is presented in FIG. 9.

The invention claimed is:

1. A process for synthesizing a microporous ITQ-16 material having an X-ray diffraction pattern with diffraction peaks at 2θ angles of 6.9°, 7.6° and 9.6° comprising the steps of:
   a. providing a reaction mixture comprising a Si source, a Ge source, and an organic structure directing agent;
   b. adding a source of hydroxide to obtain an initial pH between 14 and 9; and
   c. heating the reaction mixture at a temperature between 80° C. and 250° C.

2. A process according to claim 1, wherein the organic structure directing agent is selected from the group consisting of tetraalkylammonium organic cations having a general formula $(R1R2R3R4N)^+$, wherein R1, R2, R3 and R4 may be alkyl or aromatic chains with 1 to 16 carbon atoms, and organic polycations having a general formula $R_m N_x((CH_2)_n)_p$ wherein x is between 2 and 12, n refers to the number of carbon atoms forming alkyl chains bridge between two contiguous nitrogen atoms and is between 1 and 6, p refers to number of alkyl chain bridges between nitrogen atoms and is between 2 and 24, R represents alkyl or aryl groups bonded to a single nitrogen atom (N) containing between 1 and 12 carbon atoms and m is between 0 and 36.

3. A process according to claim 1, wherein the reaction mixture is heated to a temperature between 130° C. and 175° C.

4. A process according to claim 1, wherein the pH of the initial reaction mixture is between 13 and 10.

5. A process according to claim 1, wherein the reaction mixture also contains a trivalent cation source.

6. A process according to claim 5, wherein the trivalent cation is selected from among Al, B, Fe and Cr.

7. A process according to claim 1, wherein the reaction mixture further comprises a tetravalent cation source other than Si and Ge.

8. A process according to claim 7, wherein the tetravalent cation is selected from the group consisting of Ti, Sn and V.

Figure 4:
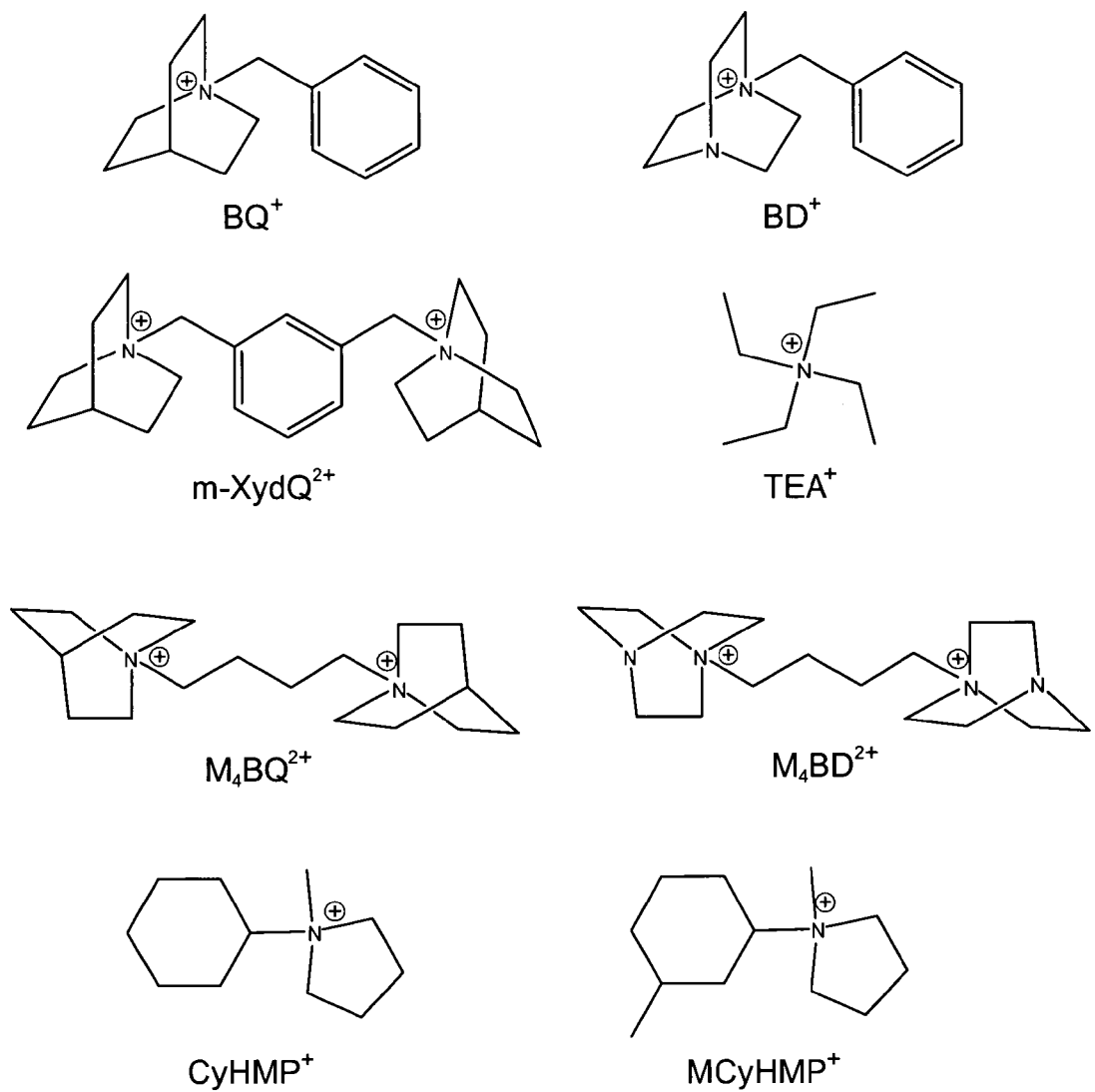
FIG. 4 shows various organic cations that may be used as a structure directing agent.
Figure 5:
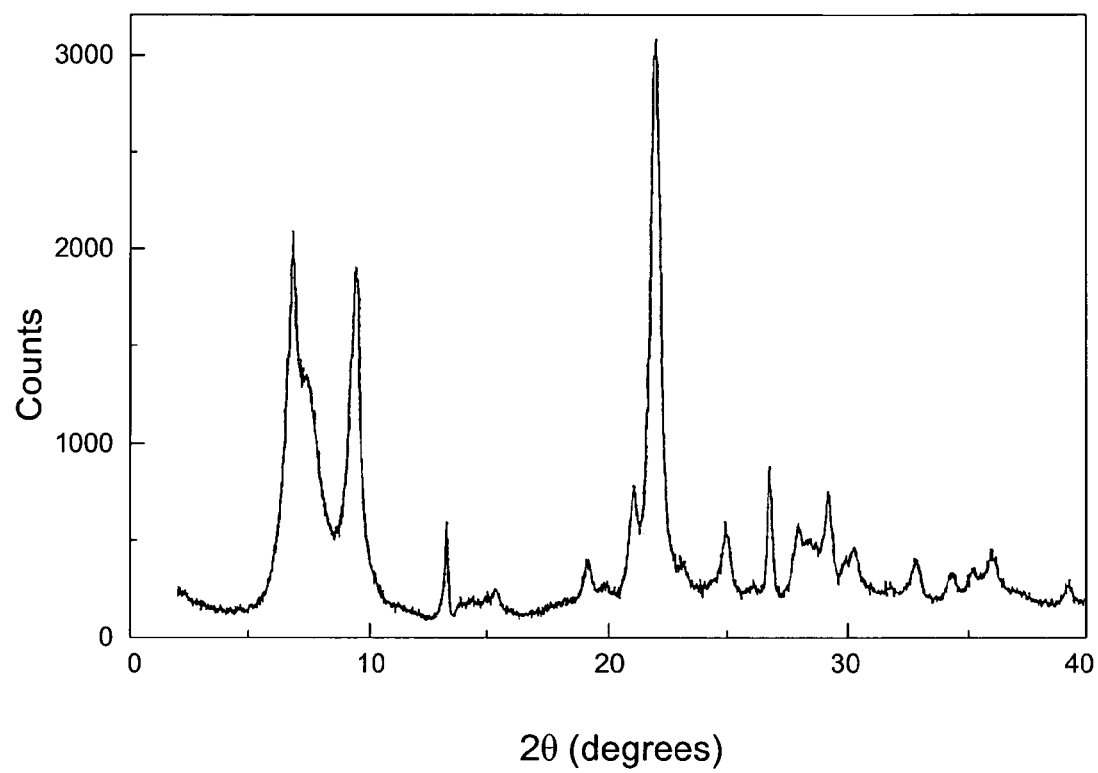
FIG. 5 shows the diffraction pattern of roasted zeolite ITQ-16, that corresponds to the data given in Table II.

9. A process according to claim 1, wherein the organic structure directing agent is selected from the group represented in FIG. 4.

10. A process according to claim 1, wherein the organic structure directing agent is $BD^+$, and wherein the reaction mixture has molar ratios within the following intervals:

$BD^+/(SiO_2+GeO_2)$=between 3 and 0.01,
   $H_2O/(SiO_2+GeO_2)$=between 1000 and 0.5,
   $GeO_2/(SiO_2+GeO_2)$, defined as g,=between 0.8 and 0.0005.

11. A process according to claim 10, wherein the molar ratio $BD^+/(SiO_2+GeO_2)$ is between 1 and 0.03.

12. A process according to claim 10, wherein the molar ratio $H_2O/(SiO_2+GeO_2)$ is between 100 and 2.

13. A process according to claim 10, wherein the molar ratio $GeO_2/(SiO_2+GeO_2)$ is between 0.5 and 0.032.

14. A process according to claim 10, wherein the molar ratio $GeO_2/(SiO_2+GeO_2)$ is between 0.333 and 0.625.

15. A process according to claim 10, wherein the reaction mixture further comprises at least one trivalent element X such that the molar ratio (Si+Ge)/X is at least 15.

16. A process according to claim 15, wherein the molar ratio (Si+Ge)/X is larger than 15.

17. A process according to claim 15, wherein the molar ratio (Si+Ge)/X is larger than 20.

18. A process according to claim 10, wherein the reaction mixture further comprises at least one tetravalent element, T, other than Ge and Si.

19. A process of according to claim 18, wherein the molar ratio $SiO_2+GeO_2/TO_2$ is at least 10.

20. A process according to claim 18, wherein the tetravalent element, T, is selected from the group consisting of Ti, Sn and V.

21. A process according to claim 18, wherein the molar ratio $SiO_2+GeO_2/TO_2$ in the reaction mixture is larger than 20.

22. A process according to claim 11, wherein the reaction mixture also comprises an alkali metal or alkaline earth metal cation, $M^{+n}$.

23. A process according to claim 22, wherein the alkali metal or alkaline earth metal cation is selected from the group consisting of Na, Ba, K, Ca and Mg.

24. A process according to claim 22, wherein the molar ratio $M^{+n}/SiO_2+GeO_2$ is less than 2.

25. A process according to claim 22, wherein the molar ratio $M^{+n}/SiO_2+GeO_2$ is less than 1.

26. A process according to claim 22, wherein the molar ratio $M^{+n}/SiO_2+GeO_2$ is less than 0.5.

27. A process according to claim 1, further comprising roasting at a temperature higher than 450° C.

28. A process according to claim 27, wherein the roasting step yields a roasted and anhydrous material of an empirical formula:

$$x(MXO_2):fTO_2:gGeO_2(1-g)SiO_2$$

wherein

T represents at least one tetravalent element, T, other than Ge and Si,

X represents at least one element in a trivalent oxidation state,

M represents at least one alkali metal or alkaline earth metal cation, the molar ratio $GeO_2/(SiO_2+GeO_2)$, defined as g, is between 0.8 and 0.005, the molar ratio (Si+Ge)/X is at least 5, and the molar ratio $SiO_2+GeO_2/TO_2$ is at least 10.

* * * * *